United States Patent
Laub et al.

(10) Patent No.: US 7,730,022 B2
(45) Date of Patent: Jun. 1, 2010

(54) DATA PROCESSING SYSTEM AND METHOD FOR SUPPLY CHAIN MANAGEMENT

(75) Inventors: Udo Laub, Hambrücken (DE); Manfred Metz, Karlsruhe (DE); Ralf Kühner, Kaiserlautern (DE)

(73) Assignee: SAP AG, Walldorf (DE)

( * ) Notice: Subject to any disclaimer, the term of this patent is extended or adjusted under 35 U.S.C. 154(b) by 1303 days.

(21) Appl. No.: 10/869,070

(22) Filed: Jun. 17, 2004

(65) Prior Publication Data

US 2005/0131947 A1    Jun. 16, 2005

(30) Foreign Application Priority Data

Dec. 12, 2003    (EP) .................. 03028493

(51) Int. Cl.
*G06F 17/30* (2006.01)
(52) U.S. Cl. .................................. 707/603
(58) Field of Classification Search ............... 707/104.1
See application file for complete search history.

(56) References Cited

U.S. PATENT DOCUMENTS

| | | | | |
|---|---|---|---|---|
| 5,134,574 | A * | 7/1992 | Beaverstock et al. ......... | 702/84 |
| 5,570,291 | A * | 10/1996 | Dudle et al. ................. | 700/95 |
| 5,880,960 | A * | 3/1999 | Lin et al. .................... | 700/99 |
| 6,292,830 | B1 * | 9/2001 | Taylor et al. ................ | 709/224 |
| 6,345,259 | B1 * | 2/2002 | Sandoval .................... | 705/7 |
| 2003/0144932 | A1 * | 7/2003 | Martin et al. ................ | 705/32 |
| 2003/0158795 | A1 * | 8/2003 | Markham et al. ............ | 705/28 |

OTHER PUBLICATIONS

Gabriel, C., "PCT International Search Report", European Patent Office, May 19, 2005.*
Transaction Processing Council, "Overview of the TPC-C Benchmark", Retrieved Aug. 22, 2006 <http://www.tpc.org/tpcc/detail.asp>.*
Transaction Processing Council, "TPC-Results Pre Dec. 31, 2002", Retrieved Aug. 22, 2006 <http://www.tpc.org/tpcc/results/tpcc_advanced_sort.asp>.*
Hewlett-Packard Company, HP-UX 11i Version 1.6, Jun. 2002, at(1) manpage.*
MKS, "MKS Toolkit 8.0 Product Family Ships: First Secure Shell with UNIX Commands and Utilities on Windows", Published Jan. 14, 2002, Retrieved Aug. 23, 2006, p. 1-2.*
OED.com, "Oxford English Dictionary", Retrieved Dec. 26, 2006, 2nd Ed., Entry for "fiscal", p. 1-3. (renumbered).*
PCT Search Report and Written Opinion, dated May 19, 2005 (12 pages).

* cited by examiner

*Primary Examiner*—Khanh B Pham
(74) *Attorney, Agent, or Firm*—Finnegan, Henderson, Farabow, Garrett & Dunner, LLP

(57) ABSTRACT

The data processing system has an online transactional processing (OLTP) system for receiving of reporting data from work centers of a production line. The production line is logically divided into shop areas. At the exits of each shop area where an intermediate product is completed one reporting point serves as exit point in order to report the completion of an intermediate production step. This data is stored in the OLTP system and retrieved at a later point of time in order to generate a table containing aggregated intermediate product quantities per shop area. This table is transferred to a financial data server for calculation of the value of work in progress.

15 Claims, 7 Drawing Sheets

DATA PROCESSING SYSTEM AND METHOD FOR SUPPLY CHAIN MANAGEMENT

FIELD

The present invention generally relates to the field of data processing, and more particularly without limitation, to online transactional processing.

BACKGROUND

Supply chain planning, which comprises the logistical plan of an in-house supply chain, is essential to the success of many of today's manufacturing firms. Most manufacturing firms rely on supply chain planning in some form to ensure the timely delivery of products in response to customer demands. Typically, supply chain planning is hierarchical in nature, extending from distribution and production planning driven by customer orders, to materials and capacity requirements planning, to shop floor scheduling, manufacturing execution, and deployment of products. Supply chain planning ensures the smooth functioning of different aspects of production, from the ready supply of components to meet production demands to the timely transportation of finished goods from the factory to the customer.

A modern supply chain often encompasses a vast array of data. The planning applications that create and dynamically revise plans in the supply chain in response to changing demands and capacity require rapid access to data concerning the flow of materials through the supply chain. The efficient operation of the supply chain depends upon the ability of the various plans to adjust to changes, and the way in which the required data is stored determines the ease with which it can be accessed.

Operations in a production line of a plant for producing a product are carried out at work centers. In supply chain planning tools work centers are represented by business objects that can e.g. represent the following real work centers: machines or machine groups; production lines; assembly work centers; and employees or groups of employees.

Together with bills of material and routings, business objects representing work centers belong to the master data in production planning and control systems. Business objects representing work centers are used in task list operations and work orders. Task lists are for example routings, maintenance task lists, inspection plans and standard networks. Work orders are created for production, quality assurance, plant maintenance and for the project system as networks.

Data in work centers is used for scheduling, costing, capacity planning, and simplifying operation maintenance. For the purpose of scheduling, operating times and formulas are entered in the business object representing the work center, so that the duration of an operation can be calculated. For the purpose of costing, formulas are entered in the business object representing the work center, so that the costs of the operation can be calculated. Usually a business object representing the work center is also assigned to a cost center.

The available capacity and formulas for calculating capacity requirements are entered into the business object representing a work center for capacity planning. Further, various default values for operations can be entered in the business object representing the work center for simplifying operation maintenance.

A business object representing a work center is created for a plant and is identified by a key. The work center category that can be defined in customising, determines which data can be maintained in the business object representing the work center.

Supply chain planning and management tools as the SAP R/3 system use routing. Routing is a description of which operations, e.g. process steps, have to be carried out and in which order to produce a product. In addition to information about the operations and the order in which they are carried out, routing also contains details about the work centers at which they are carried out as well as about the required production resources and tools. Standard values for the execution of individual operations are also saved in routings. Usually a bill of material (BOM) is assigned to routing. Individual components of the BOM are assigned to the routing operations.

SUMMARY

One embodiment consistent with the present invention provides for a data processing system comprising an online transactional processing (OLTP) system for receiving of reporting data from a set of reporting points of work centers of a production line for producing a product. The production line is logically divided into shop areas where each shop area comprises one or more work centers. Each shop area corresponds to an intermediate production step for producing an intermediate product. The intermediate production step of the shop area is completed at the exit point of the shop area. An exit point is a special reporting point that serves to report when an intermediate production step is completed.

The reporting data from the reporting points including the exit points is received by the OLTP system and stored in a database. For example, the reporting data is received in the form of documents, where each document contains data indicating a quantity of an intermediate product that has been completed in the corresponding intermediate production step and/or a scrap quantity. Scrap is reported when the intermediate product does not conform to quality standards.

On the basis of the reporting data stored in the database a table is generated that comprises aggregated quantities of intermediate products and/or scrap at the exit points. This way one aggregated quantity of intermediate product and/or scrap is obtained per shop area. The table is locally stored by the OLTP system.

The OLTP system is coupled to a server computer that has storage for a second table with value increments per shop area. Preferably, the server computer is a financial data server that can calculate the value increments of the individual shop areas based on master data stored in a master data server.

The server computer has a processor for running a program to calculate a total value of the work in process by means of the table comprising the aggregated quantities and by means of the table with the value increments per shop area. This way the total value of the intermediate products of the production line is valuated, such as for the purposes of accounting, asset management, book keeping, financial planning and/or company valuation and financial reporting.

The present invention may be particularly advantageous in that the OLTP system locally generates a table with the aggregated quantities of the intermediate products and/or scrap per shop area as reported from the exit points. This way a dramatic data compression is accomplished—comparing the resulting table size with the reporting data stored in the database. The table comprising the aggregated quantities is transferred from the OLTP system to the server computer when the total value of the work in process is to be calculated.

It is to be noted that only the table comprising the aggregated quantities may need to be transmitted to the server computer in order to calculate this total value but not the complete reporting data stored in the database. This has the advantage that the transfer of the aggregated reporting data required to calculate the total value only minimally loads the network.

Another advantage is that only a small portion of the capacity of the server computer's processor is required to perform the calculation of the total value. This is due to the fact that the table comprising the value increments is only calculated once and then stored for future reference. This is further due to the fact that only a limited number of calculations needs to be performed to obtain the total value of the work in process based on the table comprising the aggregated quantities and the table comprising the value increments.

The present invention may also be particularly advantageous as it facilitates to calculate the total value of work in process even when the routing is changed. In a real life plant the routing is changed quite frequently. This is reflected in the routing data stored in the master data server. When the routing data and/or the bill of materials is changed the financial data server recalculates the table comprising the value increment per shop area. Other than that, no change is required as the processing logic is not affected by the modification of the master data.

In accordance with a further embodiment consistent with the present invention, the calculation of the value of the work in process is initiated by a push-service of the OLTP system. For example, the OLTP system has a timer; each time the timer expires the OLTP system triggers the push-service in order to transfer the table with the aggregated quantities to the financial data server. This transfer triggers the calculation of the total value of the work in process by the financial data server.

Alternatively the calculation of the total value of the work in process is implemented as a pull-service, i.e. the financial data server pulls the table comprising the aggregated quantities from the OLTP system at regular and/or pre-scheduled times or time intervals and/or on a user's request.

It is understood that both the foregoing general description and the following detailed description are exemplary and explanatory only and are not restrictive of the invention, as claimed.

BRIEF DESCRIPTION OF THE DRAWINGS

In the following, embodiments consistent with the invention will be described in greater detail by making reference to drawings in which.

DESCRIPTION OF THE EMBODIMENTS

Figure 1:
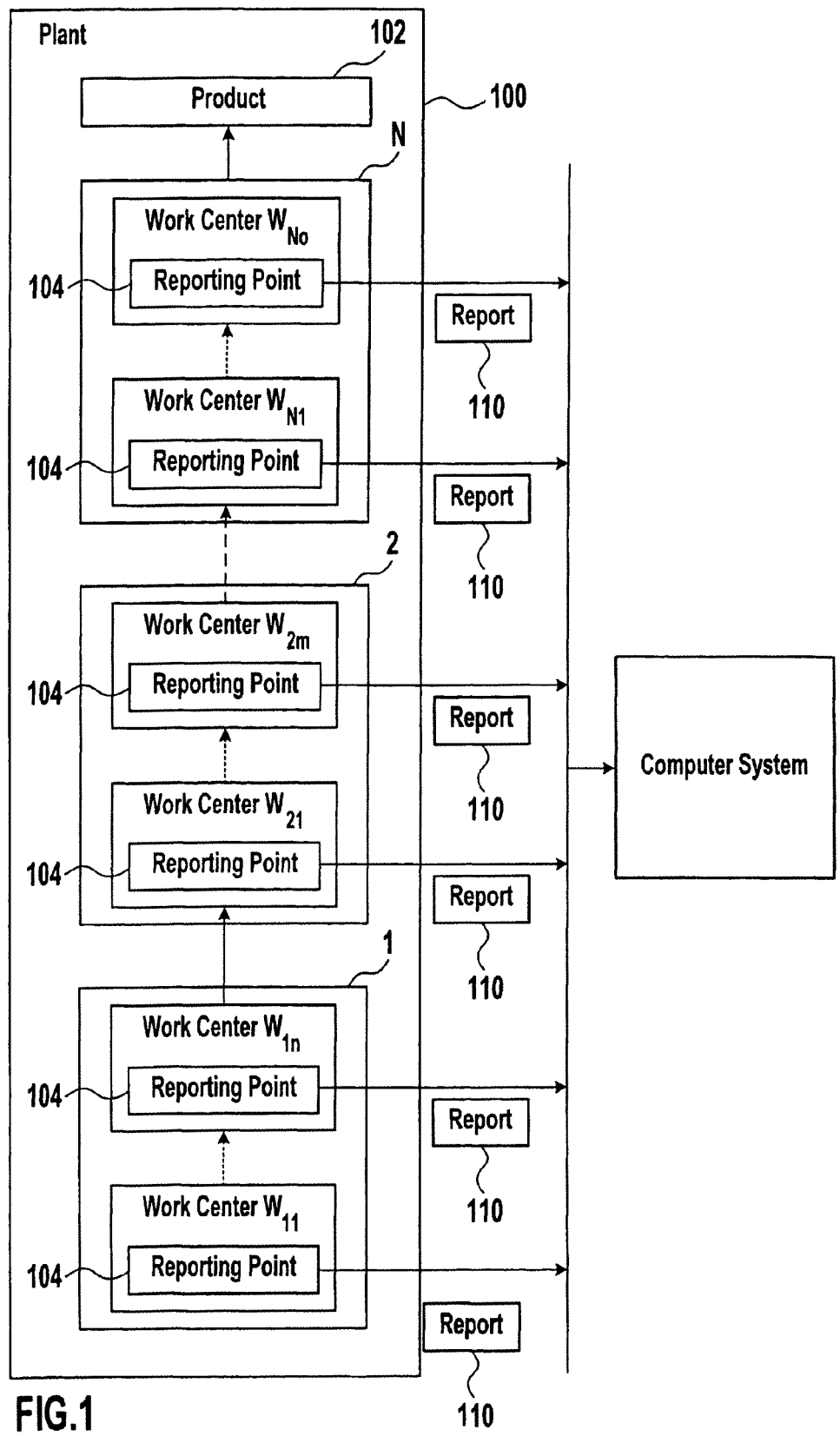
FIG. 1 is a schematic block diagram of a production plant coupled to a computer system.

FIG. 1 shows plant 100 that has at least one production line for producing product 102. The production line is constituted by a number of work centers W. Each work center W has a reporting point 104 coupled to network 106. This way reporting points 104 are coupled to computer system 108.

The reporting points 104 serve for the purpose of plant data collection. A reporting point 104 can be implemented as a sensor, e.g. a bar code reader, or it can be a personal computer for manually entering reporting data.

The production line is logically divided into shop areas 1, 2, ... N. Each one of the shop areas 1, 2, ... N corresponds to an intermediate production step, i.e. at the exit of a shop area an intermediate product is obtained. When the intermediate product does not meet quality standards scrap is obtained instead.

Each one of the shop areas 1, 2, ... N comprises at least one work center W. For example shop area 1 has a number of n work centers $W_{11}, W_{12}, W_{13}, \ldots W_{1n}$. In the work center $W_{1n}$ the intermediate production step performed in shop area 1 is completed. Hence reporting point 104 of work center $W_{1n}$ is defined as the exit point for reporting quantities of the intermediate products completed in shop area 1. Likewise scrap produced in shop area 1 is reported from the exit point implemented by reporting point 104 of work center $W_{1n}$.

Likewise shop area 2 that follows shop area 1 has a number of m work centers $W_{21}, W_{22}, \ldots, W_{2m}$.

A plurality of other shop areas may subsequently follow after shop area 2 in the production line. The last shop area N of the production line has a number of o work centers, i.e. work centers $W_{N1}, W_{N2}, \ldots, W_{No}$.

In operation reporting data is acquired at the reporting points 104 in order to reflect the status of the ongoing production. Corresponding report documents 110 are sent from the reporting points 104, including the exit points at the boundaries of the shop areas, to computer system 108 via network 106.

Figure 2:
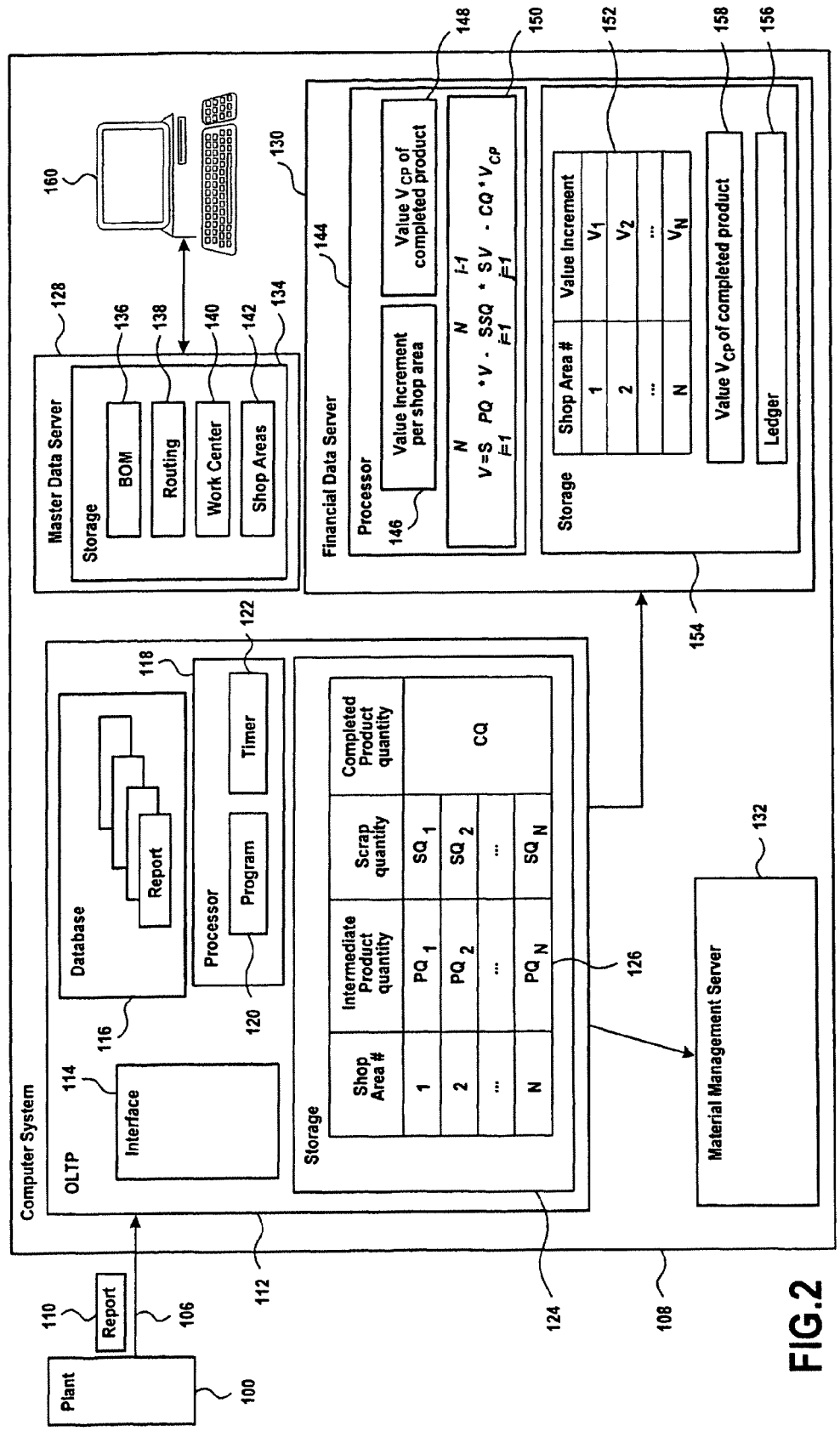
FIG. 2 is a block diagram of the computer system having an OLTP system and a financial data server.

FIG. 2 shows a detailed block diagram of computer system 108. Computer system 108 has OLTP system 112. OLTP system 112 has interface 114 for receiving report documents 110 of network 106. Further OLTP system 112 has database 116 for storing report documents 110 received from plant 100.

OLTP system 112 has at least one processor 118 for running computer program 120 and timer 122.

Storage 124 of OLTP system 112 serves to store table 126. As the size of table 126 is quite limited in comparison to the amount of data contained in the report documents 110 it can either be held in the working memory of OLTP system 112 as an alternative to storage on a primary storage device, such as a hard disk.

Table 126 has two entries for each one of the shop areas 1, 2, ... N. One entry is for the aggregated quantity of the intermediate products completed in the respective shop area and the other entry is for the scrap reported from that shop area at its exit point. For example table 126 has entry $PQ_1$ for the aggregated quantity of intermediate product produced in shop area 1 and reported from the exit point of shop area 1. Likewise entry $SQ_1$ shows the aggregated scrap quantity reported from the exit point of shop area 1.

In general terms table 126 has entries $PQ_i$ and $SQ_i$ for the aggregated intermediate product quantity and the aggregated scrap quantity reported from the exit point of shop area i.

Further, table 126 may contain an entry CQ for indicating the aggregated quantity of completed product 102 (cf. FIG. 1) that has left the production line. Usually the aggregated completed product quantity CQ is identical to the aggregated quantity $PQ_N$ reported from the last exit point of the last shop area N of the production line.

OLTP system 112 is coupled to master data server 128, financial data server 130 and material management server 132.

OLTP system 112, master data server 128, financial data server 130 and/or material management server 132 can be implemented on separate server computers being interconnected by a network. Alternatively OLTP system 112, master data server 128, financial data server 130 and/or material management server 132 are implemented as separate logical servers on a common physical unit, such as a parallel processing computer system or a blade computer system.

Master data server 128 has storage 134 for storing of master data, such as bill of materials (BOM) 136, routing data 138, and work center objects 140, i.e. business objects representing the work centers W of the production line of plant 100 (cf. FIG. 1). Further master data server 128 stores master data in order to define shop areas 1, 2, ... N (cf. FIG. 1). Shop areas can be defined by storing a table listing all work centers belonging to a given shop area or by other suitable shop area objects 142.

Financial data server 130 has at least one processor 144 for running program modules 146, 148, and 150. Program module 146 serves to calculate the value increments per shop area on the basis of the master data stored by master data server 128. The resulting table 152 containing the value increments $V_i$ per shop area i is stored in storage 154 of financial data server 130.

Program module 148 serves to calculate the value $V_{CP}$ of the completed product 102 (cf. FIG. 1). The value $V_{CP}$ obtained from program module 148 is also stored in storage 154.

Program module 150 serves to calculate the total value V of the work in progress, i.e. the accumulated values of the completed intermediate products being processed in the production line of plant 100 (cf. FIG. 1). This calculation also considers scrap and subtracts the value of the completed product as completed products is no longer work in process by definition. The corresponding formula is given below $$V = \sum_{i=1}^{N} PQ_i * V_i - \sum_{i=1}^{N} SQ_i * \sum_{j=1}^{i-1} V_j - CQ * V_{CP}$$

Where:

N is the total number of shop areas, $PQ_i$ is the aggregated quantity of intermediate product reported from the exit point of shop area i, $V_i$ is the value increment of the production step performed in shop area i, $SQ_i$ is the aggregated quantity of scrap reported from shop area i, CQ is the quantity of completed product that leaves the production line, and $V_{CP}$ is the value of the completed product The value V of the work in progress which is thus obtained from program module 150 can be posted in ledger 156 stored in storage 154. The value $V_C$ of the completed product obtained from program module 148 is stored on storage location 158 of storage 154.

Personal computer 160 is coupled to master data server 128 for entering and updating of master data stored in storage 134.

Material management server 132 can be implemented as the SAP R/3 component materials management (MM) for managing the supply of materials to the production line plant 100 (cf. FIG. 1).

In operation computer system 108 receives report documents 110 from plant 100 that reflect the ongoing production. The data contained in the report documents 110 is stored in relational database 116. When timer 122 expires computer program 120 is triggered. Computer program 120 has instructions for reading of master data from master data server 128, including shop area objects 142.

Further computer program 120 has instructions for performing a database query of database 116 in order to retrieve report documents 110 that originate from exit points. On this basis computer program 120 calculates the entries $PQ_i$ and $SQ_i$ for each shop area i. This way table 126 is generated and stored in storage 124.

Next table 126 is transferred from OLTP system 112 to financial data server 130. Program module 146 reads master data from master data server 128, in particular bill of materials 136, routing data 138, work center objects 140 and shop area objects 142 in order to calculate the value increment at the various intermediate production steps corresponding to the shop areas. For example, the value increment an intermediate product experiences going through a particular shop area is calculated by determining the production costs of the production steps performed in the shop area considered, i.e. the cost of materials, components, energy costs, etc. This way table 152 is obtained and stored in storage 154. On this basis, program module 148 calculates the value $V_{CP}$ and stores it in storage location 158.

When financial data server 130 receives table 126 from OLTP system 112 this invokes program module 150. On the basis of the data contained in table 126 and table 152 program 150 calculates the value V of work in progress. The value V is then posted in ledger 156.

Figure 3:
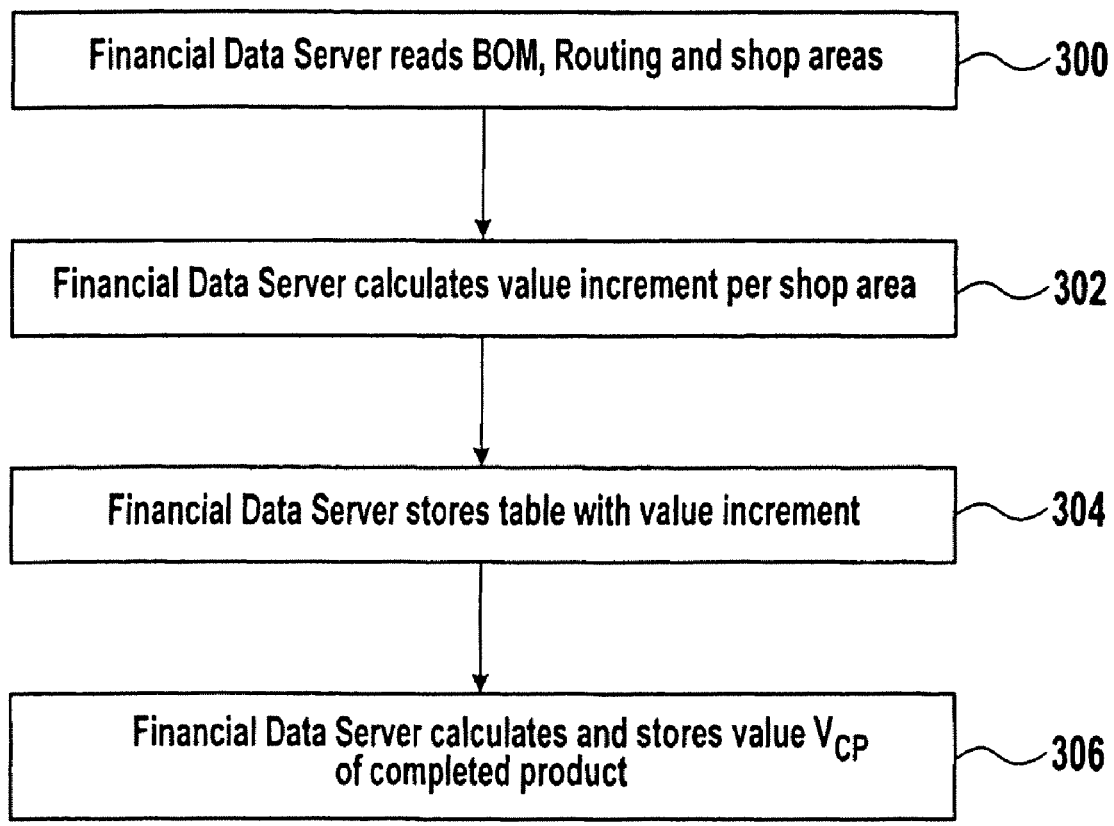
FIG. 3 is a flow chart being illustrative of the calculation of value increments per shop area of the plant by the financial data server.

FIG. 3 shows the steps performed by the financial data server in order to generate table 152 and to calculate $V_{CP}$. In step 300 the financial data server reads the required master data, e.g. bill of materials, routing data and shop area objects. In step 302 the financial data server calculates the value increment per shop area on the basis of the master data obtained in step 300. The resulting table (cf. table 152 of FIG. 2) with the value increments per shop area is stored in step 304. In step 306 the financial data server calculates the value $V_{CP}$ of the completed product by calculating the total of all value increments.

Figure 4:
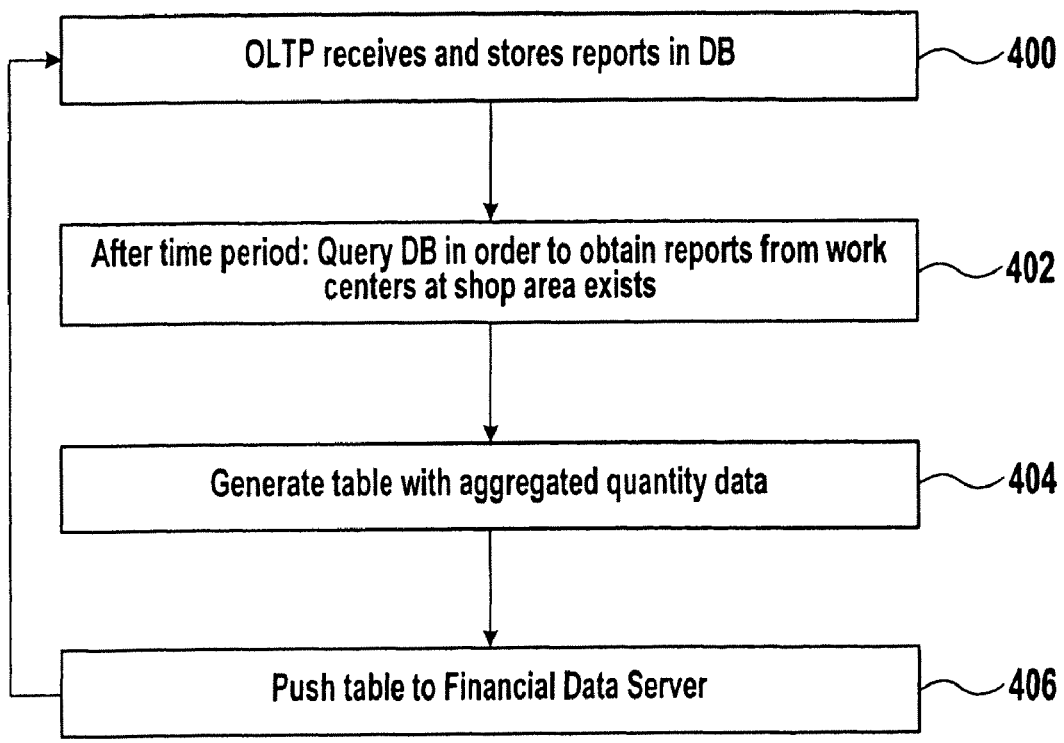
FIG. 4 is a flow chart illustrating the provision of aggregated reporting data from the OLTP system to the financial data server.

FIG. 4 shows the method performed by the OLTP system. In step 400 the OLTP system receives and stores report documents in its database. After a user defined period of time a database query is performed in order to retrieve the reports obtained from the exit points from the database (step 402). In step 404 table 126 (cf. FIG. 2) with the aggregated quantity data is generated on the basis of the retrieved report documents. In step 406 the table which is thus obtained in step 404 is pushed to the financial data server in order to trigger the calculation of the value V of work in progress. This procedure can be performed repetitively.

Alternatively table 126 is pulled from financial data server. In this case timer 122 is implemented in financial data server in order to trigger the pull of table 126.

Figure 5:
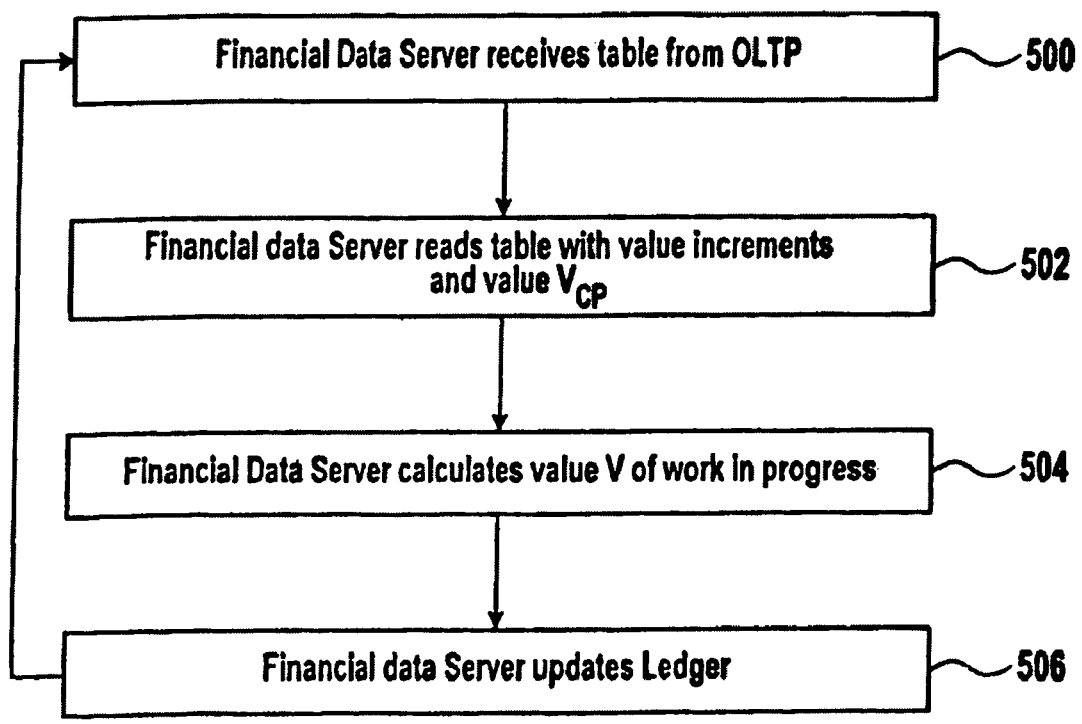
FIG. 5 is a flow chart illustrating the calculation of the value of work in process by the financial data server.

FIG. 5 illustrates the method performed by the financial data server in order to calculate value V of work in progress and to update the electronic ledger. In step 500 the financial data server receives table 126 from OLTP system; this may be implemented as "push" or "pull". In step 502 the financial data server reads table 152 with the value increments per shop area and the total of the value increments $V_{CP}$. In step 504 the financial data server calculates the value V of the work in progress on the basis of tables 126, 152 and value $V_{CP}$. In step 506 the value V of work in progress is posted in the electronic ledger of the financial data server (step 506). Again this procedure can be performed repeatedly.

Figure 6:
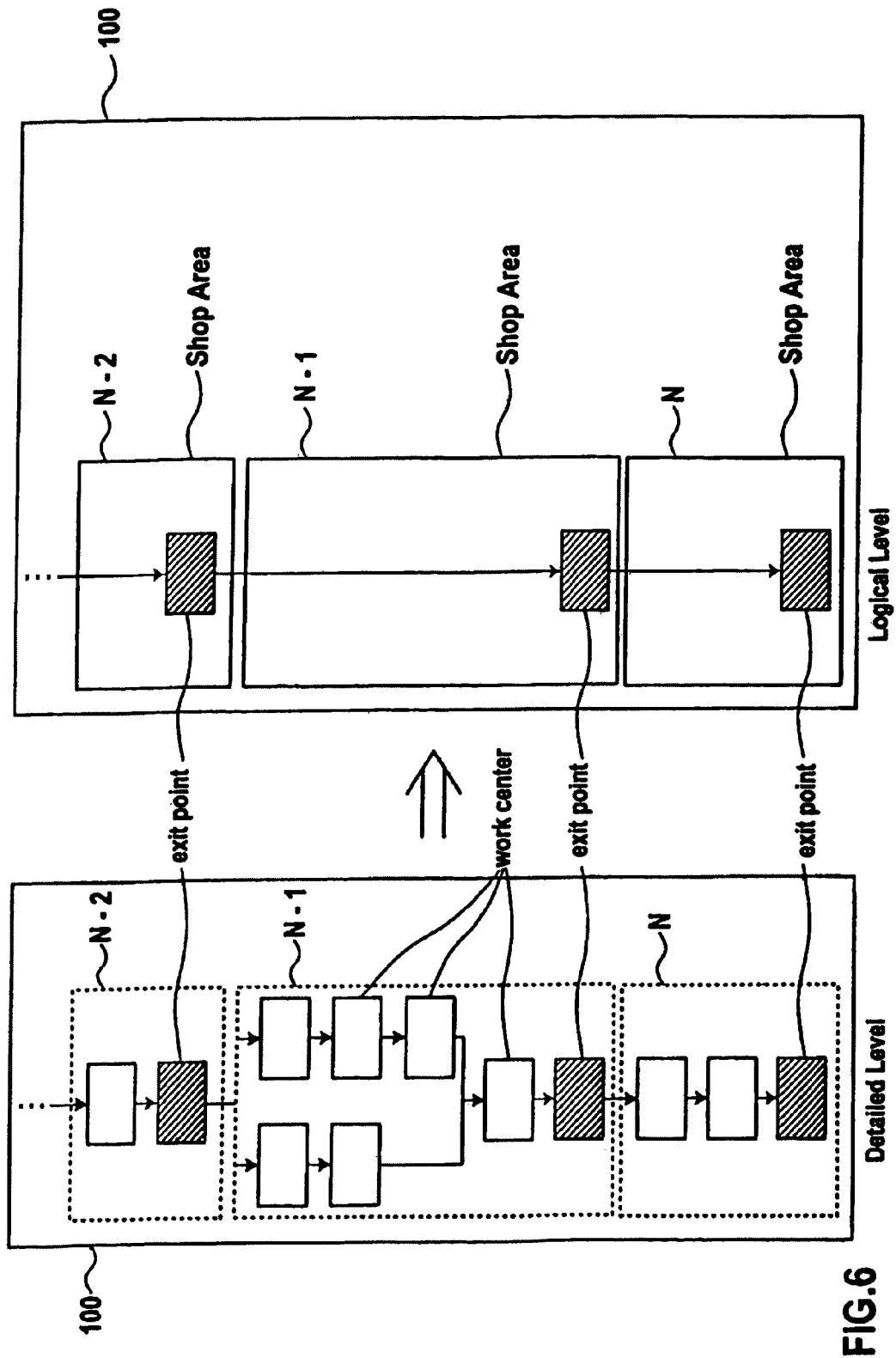
FIG. 6 shows a detailed level (logistics) view of a production plant as well as a logical level view in order to illustrate the logically division of the production plant into shop areas.

FIG. 6 shows another example for an manufacturing plant. Elements of FIG. 6 that correspond to elements of FIGS. 1 and 2 are designated by the same reference numerals.

On the left side FIG. 6 shows a detailed level logistics view of plant 100. Plant 100 has a number of work centers that are logically grouped into shop areas. For ease of explanation the last three shop areas N–b 2, N–1 and N of the total of N shop areas is shown in FIGS. 6. Like in the embodiment of FIG. 1 each one of the shop areas has an exit point at its boundary, i.e. a special reporting point for reporting of data relating to the completion of an intermediate production step to be performed in a particular shop area.

On the right side, FIG. 6 shows a logical level view of plant 100. In the logical view each one of the shop areas may be reduced to its respective exit point from where the data is reported to the computer system.

Figure 7:
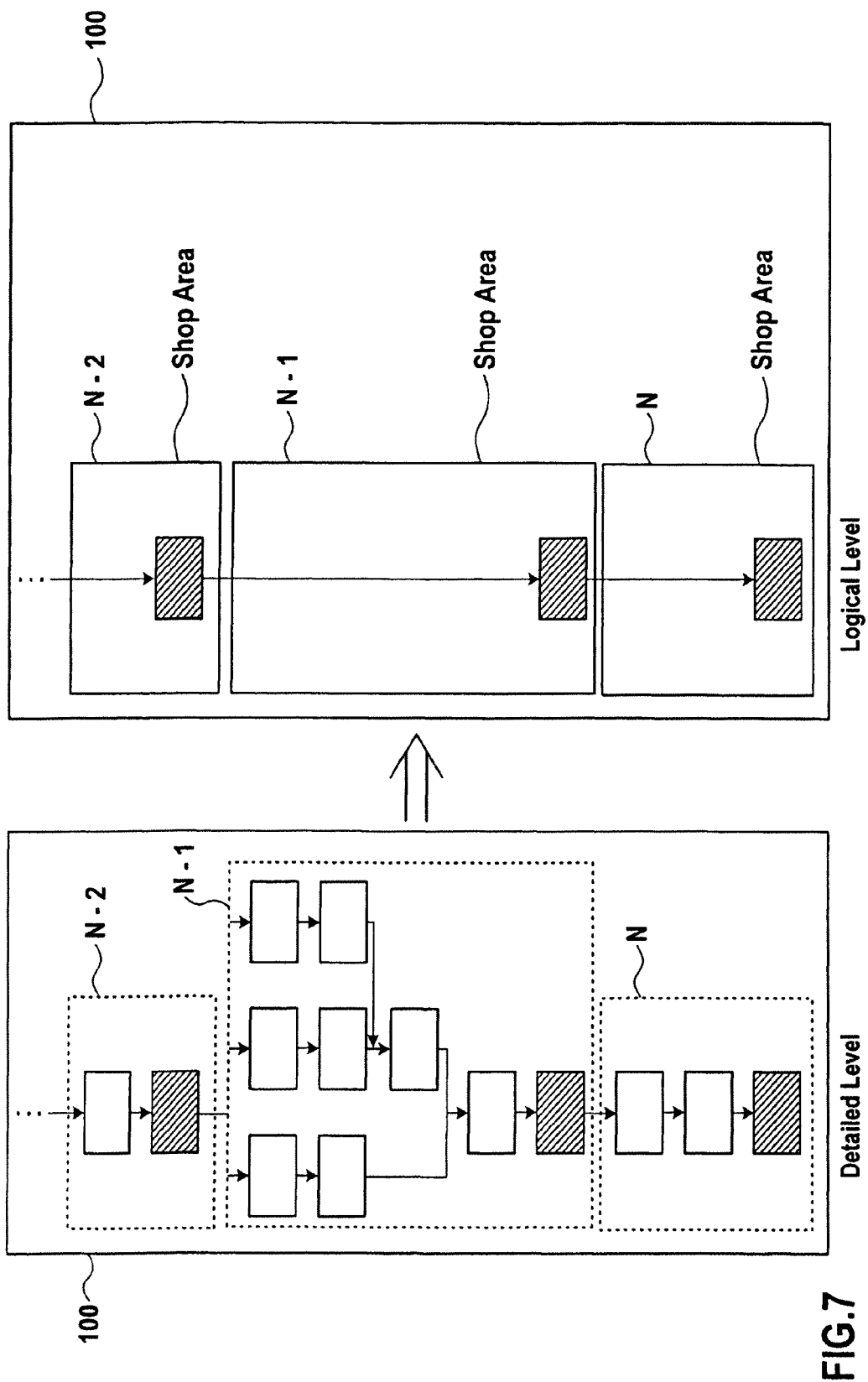
FIG. 7 shows the schematic block diagram of FIG. 6 after changing the logistics of the production plant.

FIG. 7 shows plant 100 of FIG. 6 after a parallel logistic branch of work centers has been added to the shop area N–1. As illustrated in FIG. 7 this does not affect the logical level view of production plant 100. This has the advantage that the logistics of plant 100 can be modified without affecting the logical view. Thus the data processing load for performing evaluation remains substantially unchanged when changes are made to the logistical structure as complex loops or parallel logistical structures do not need to be resolved for the purpose of valuation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data processing system, comprising:
   an online transactional processing system for receiving reporting data from a set of reporting points of work centers of a production line for producing a product, wherein the production line is logically divided into shop areas, one reporting point of each shop area being an exit point corresponding to an intermediate production step, the online transactional processing system comprising:
      a) a database for storing the reporting data,
      b) first processing means for generating a first table comprising aggregated quantities of intermediate products at the exit points on the basis of the reporting data stored in the database, and
      c) first storage means for storing the first table, and
   a server computer comprising:
      a) second storage means for storing a second table comprising value increments per shop area,
      b) second processing means for calculating a total value of the work in progress by means of the first and second tables, and
      c) means for transferring the first table from the first storage means of the online transactional processing system to the second processing means of the server computer.

2. The data processing system of claim 1, wherein the reporting data comprises data indicative of an originating reporting point and of a quantity of an intermediate product.

3. The data processing system of claim 1, wherein the database comprises a relational database.

4. The data processing system of claim 1, wherein the online transactional processing system further comprises:
   means for querying the database to retrieve quantities of the intermediate products.

5. The data processing system of claim 1, the online transactional processing system further comprising:
   timer means for initiating the generation of the first table.

6. The data processing system of claim 1, wherein the server computer further comprises:
   an electronic ledger coupled to the second processing means.

7. The data processing system of claim 1, further comprising:
   a master data server for storing routing data and data descriptive of the shop areas and exit points, the master data server being coupled to the online transactional processing system and to the server computer.

8. The data processing system of claim 7, wherein the server computer further comprises:
   means for calculating the second table on the basis of master data stored on the master data server.

9. A computer readable medium comprising program instructions embodying a method for calculating of a value of work in progress, the program instructions comprising:
   a first set of instructions for execution by a first processor of an online transactional processing system for receiving reporting data from a set of reporting points of work centers of a production line for producing a product, the production line being logically divided into shop areas, one reporting point of each shop area being an exit point corresponding to an intermediate production step, the reporting data being stored in a database, the first set of instructions operable to generate a first table comprising aggregated quantities of intermediate products at the exit points on the basis of the reporting data stored in the database and operable to store the first table in a first storage means of the online transactional processing system, and
   a second set of instructions for execution by a second processor of a server computer coupled to the online transactional processing system, the server computer having second storage means for storing a second table comprising value increments per shop area, the second set of instructions operable to calculate a total value of the work in progress by means of the first and second tables.

10. The computer readable medium of claim 9, further comprising:
    a third set of instructions for initiating a transfer of the first table from the first storage means of the online transactional processing system to the server computer.

11. The computer readable medium of claim 9, further comprising:
    a fourth set of instructions for performing a database query in order to retrieve quantities of the intermediate products.

12. The computer readable medium of claim 9, further comprising:
    a fourth set of instructions for calculating the second table on the basis of master data stored on a master data server.

13. A method of calculating of a value of work in progress on the basis of reporting data received from a set of reporting points of work centers of a production line for producing a product, the production line being logically divided into shop areas, one reporting point of each shop area being an exit point corresponding to an intermediate production step, the method comprising the steps of:

receiving the reporting data by an online transactional processing system;

storing the reporting data in a database of the online transactional processing system;

generating a first table comprising aggregated quantities of intermediate products and aggregated scrap quantities reported from the exit points on the basis of the reporting data stored in the database;

storing the first table in first storage means of the online transactional processing system;

transferring of the first table from the first storage means to a server computer, the server computer having second storage means for storing a second table comprising value increments per shop area; and calculating a total value of the work in progress by means of the first and second tables by the server computer.

14. The method of claim 13, further comprising:
performing a database query to retrieve quantities of the intermediate products and scrap quantities.

15. The method of claim 13, further comprising:
initiating the transfer of the first table from the first storage means of the online transactional processing system to the server computer at pre-scheduled time intervals or in response to a request received from the server computer.

* * * * *